Oct. 14, 1952     A. SHARP ET AL     2,613,618
CUTTING MECHANISM AND EXTRUSION NOZZLE FOR
CONTINUOUSLY MOVING PLASTIC BARS
Filed May 25, 1948     5 Sheets-Sheet 3
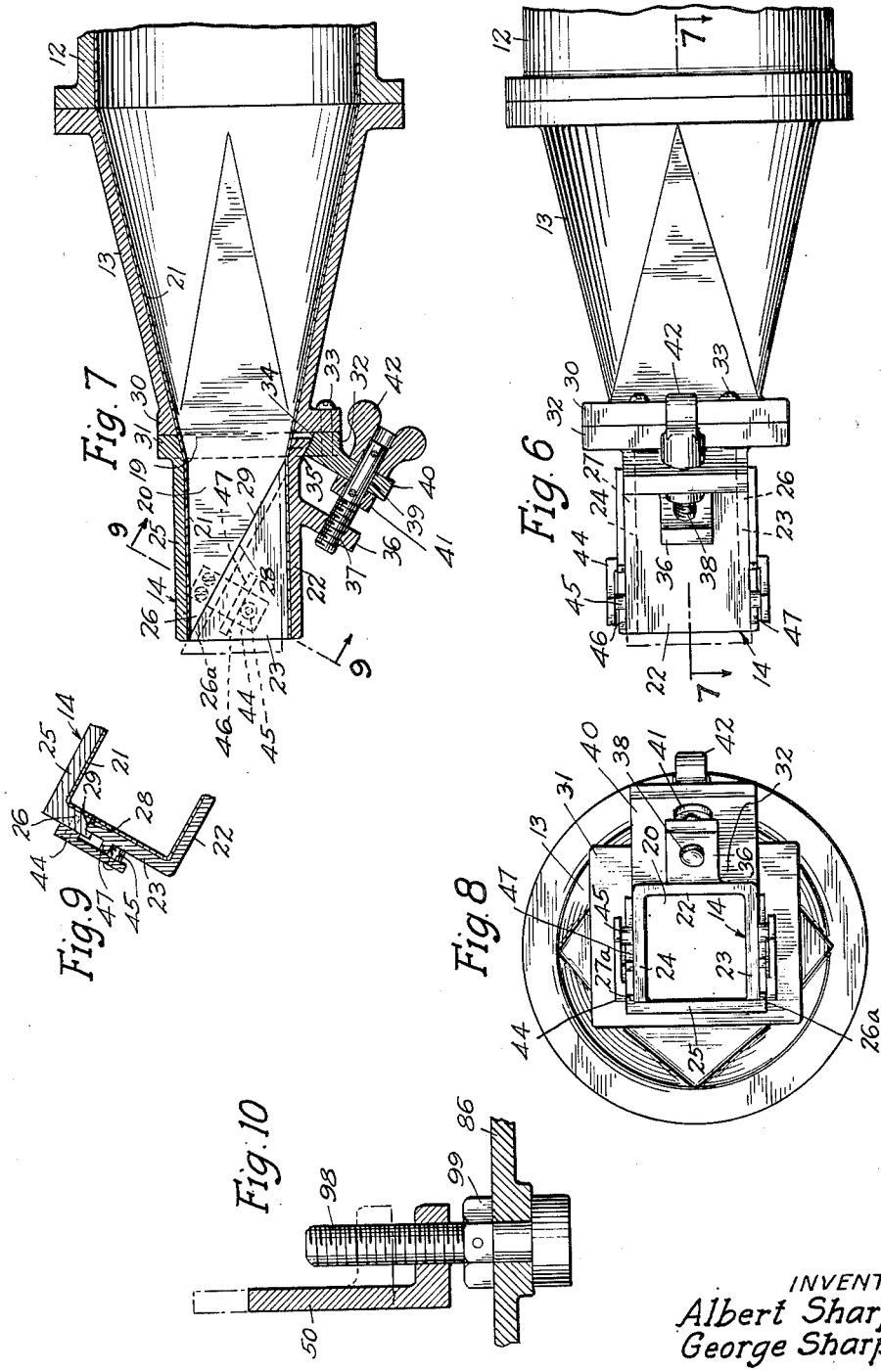
INVENTORS
Albert Sharp
George Sharp
Harry Jacobson
ATTORNEY

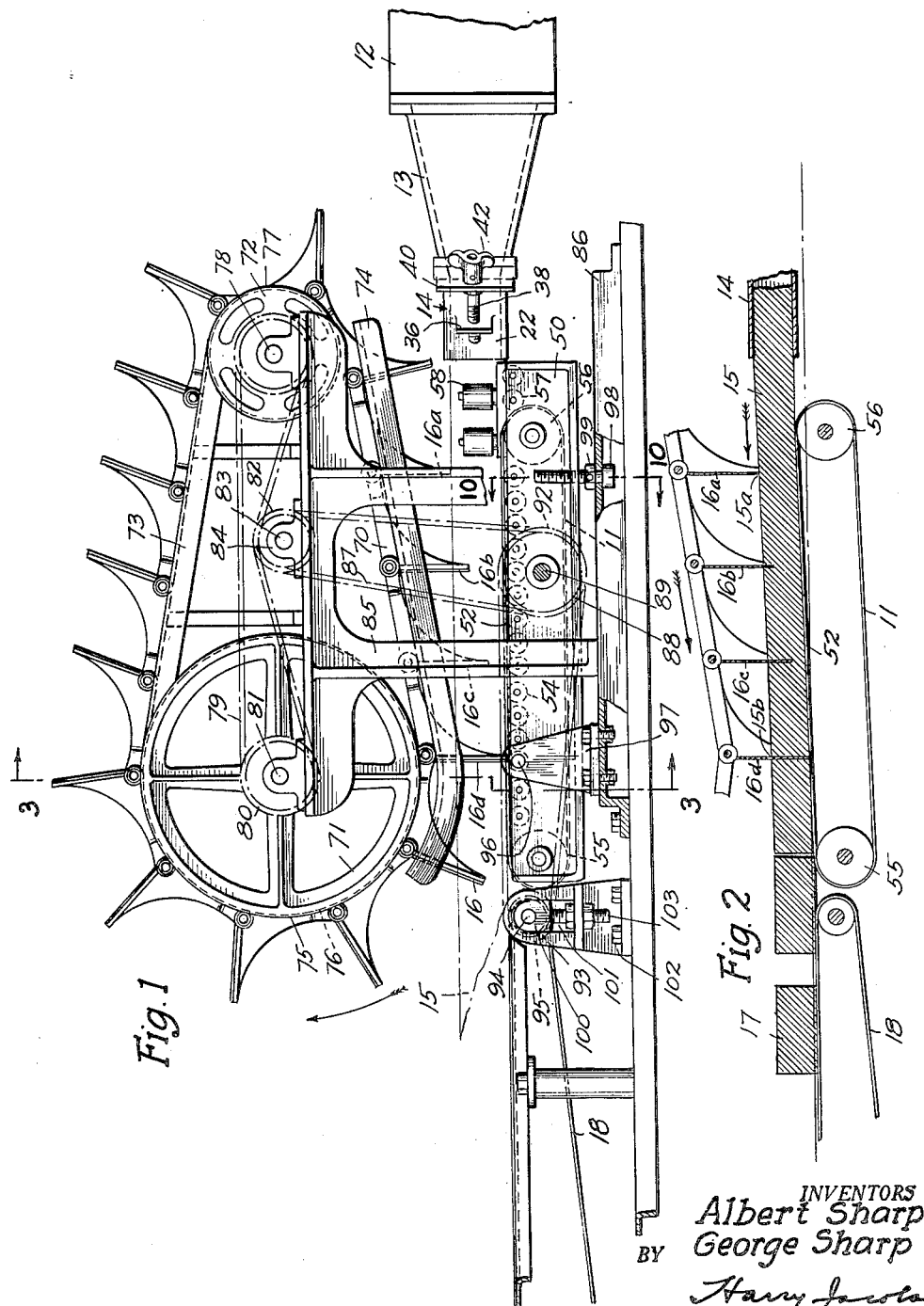

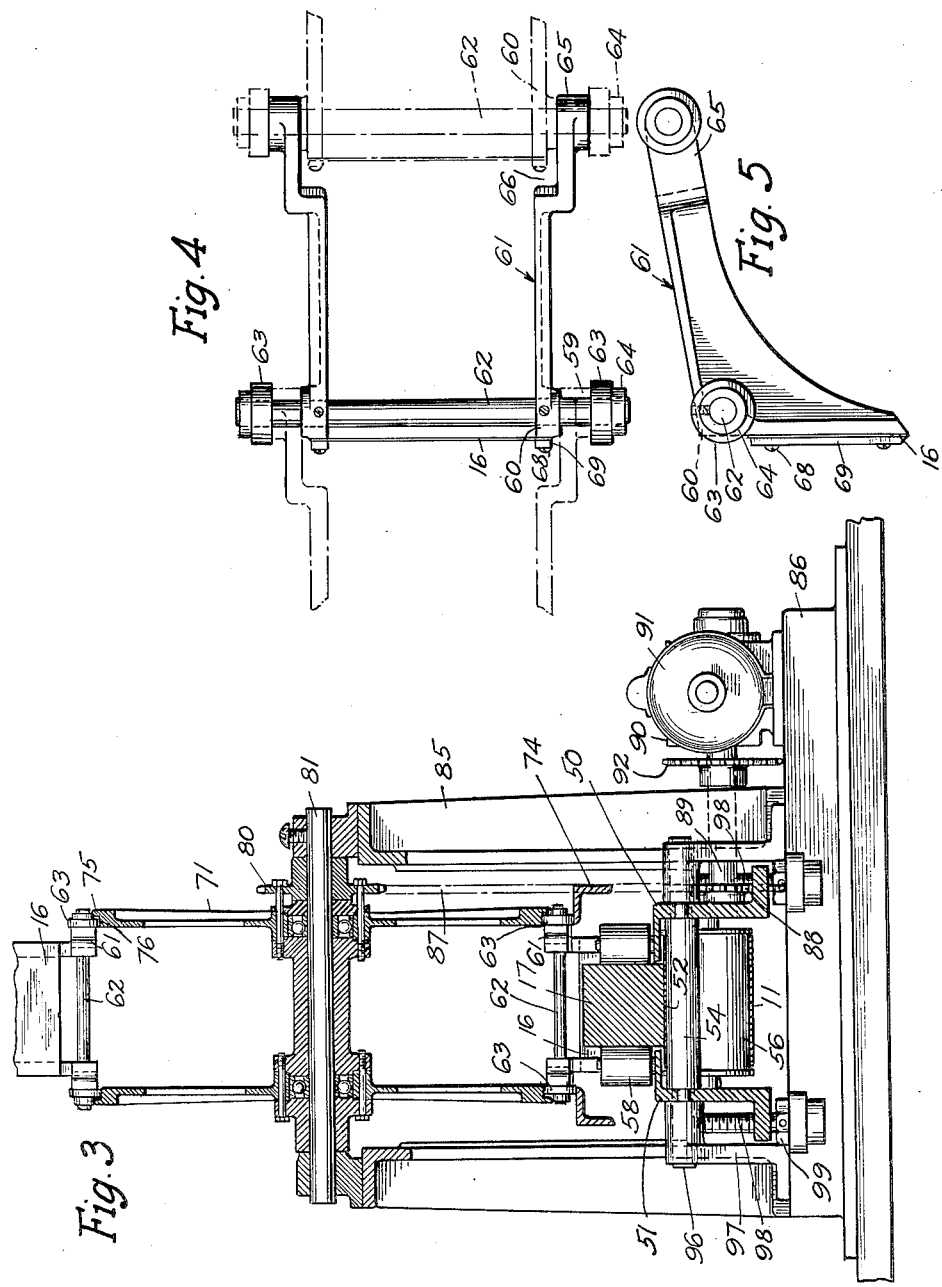

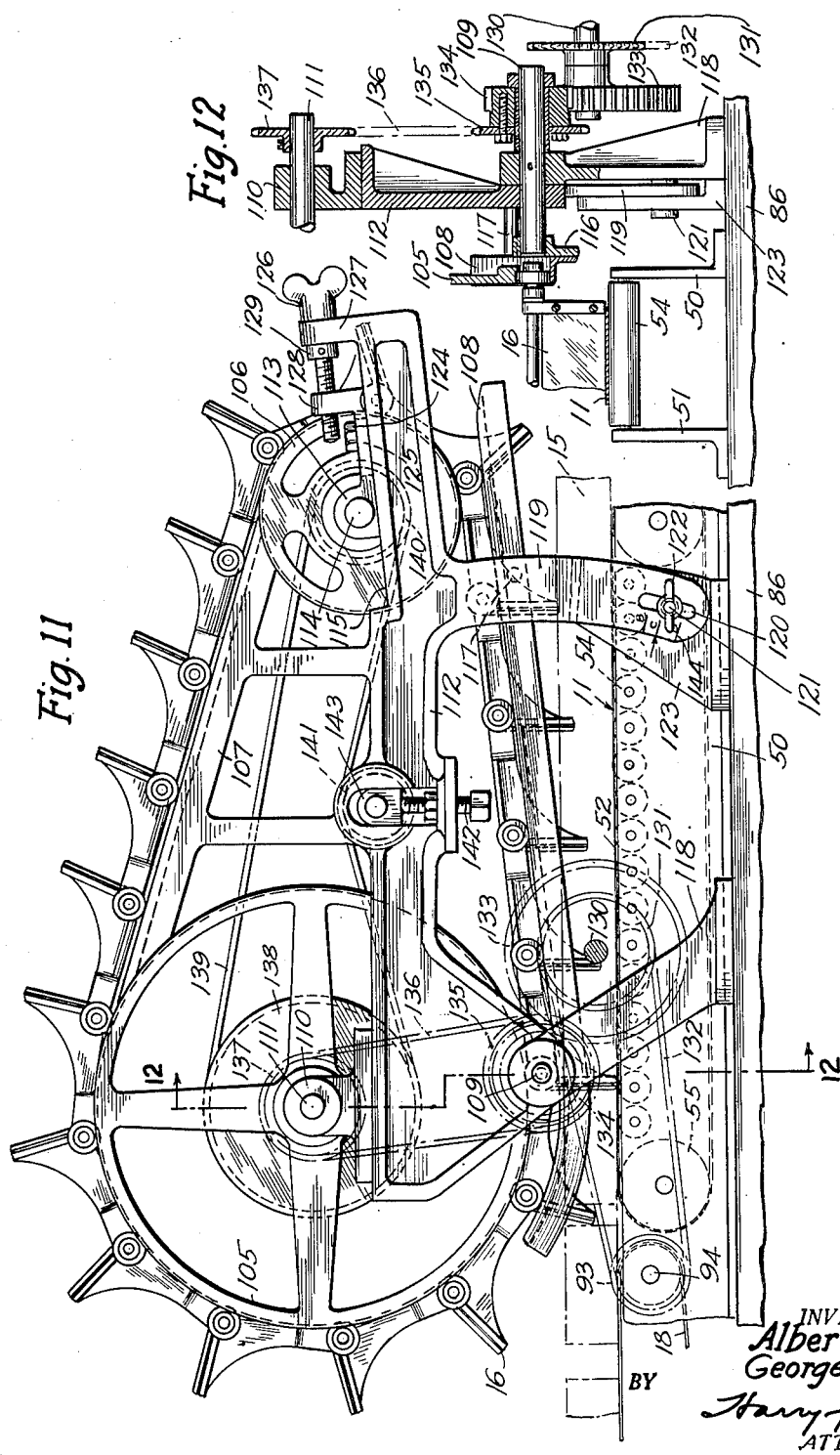

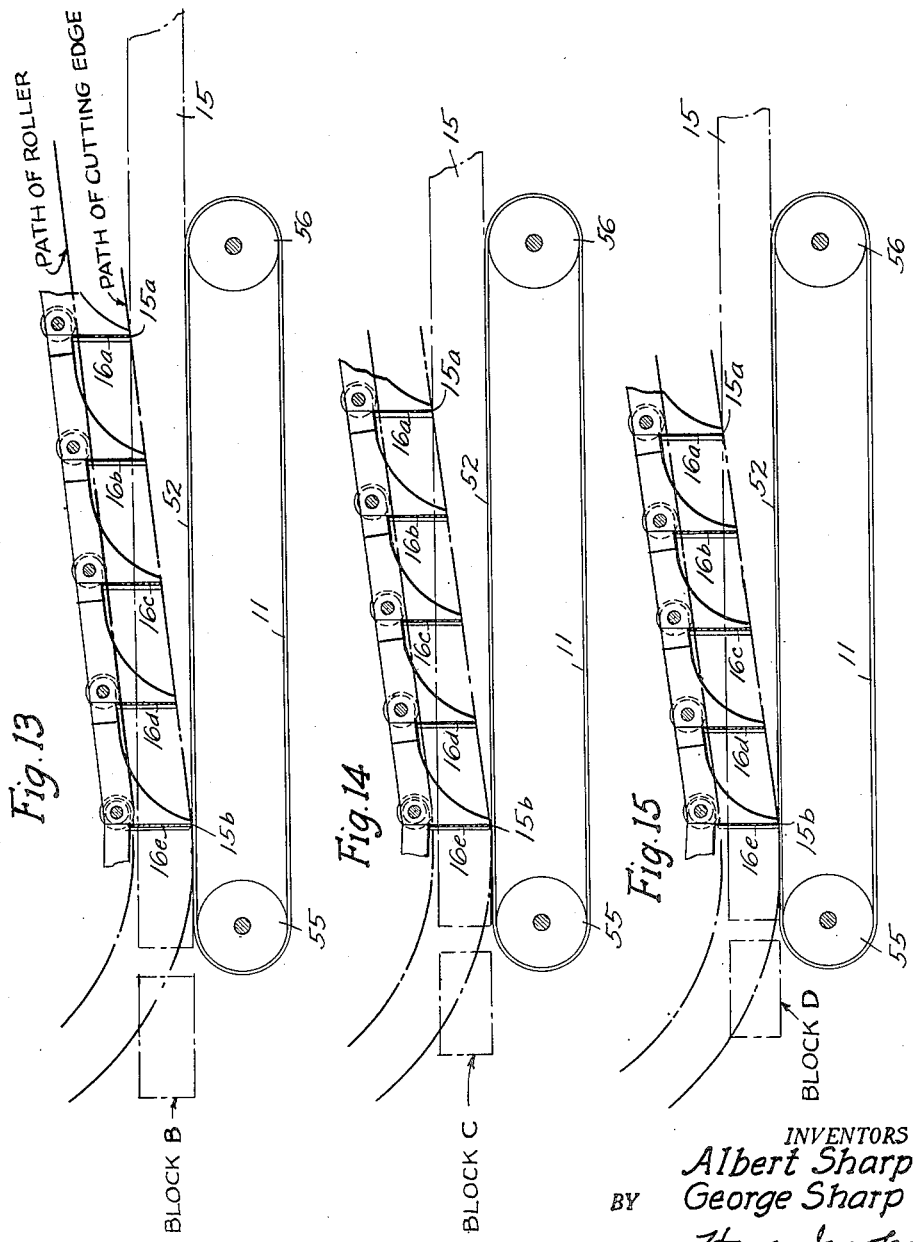

UNITED STATES PATENT OFFICE 2,613,618

CUTTING MECHANISM AND EXTRUSION NOZZLE FOR CONTINUOUSLY MOVING PLASTIC BARS

Albert Sharp and George Sharp, Bayonne, N. J.

Application May 25, 1948, Serial No. 29,136

16 Claims. (Cl. 107—14)

This invention relates to machines for cutting a continuously moving bar of plastic material such as food, yeast, soap or the like into blocks of predetermined length or of predetermined weight or size.

Many food materials such as butter, margarine, cheese, yeast and the like, as well as certain inedible materials such as soap or the like, are processed into a plastic state and then extruded through an opening of a predetermined size and shape into a long bar of indeterminate length, which must be severed into lengths of a given size. This has formerly been done by first manually cutting the moving bar into relatively long lengths as the bar emerges in its extruded state from the feeding device therefor, and subsequently cutting the lengths into shorter lengths or blocks of the required size.

In feeding, extruding, and cutting up an extruded bar of yeast, it is necessary to coat the guiding surfaces for the yeast bar, with wax of such nature as permits the bar to slide without damage, the wax serving as a lubricant between the yeast bar and its guiding surfaces. While wax offers a minimum resistance to the sliding of the yeast bar thereon, the wax coating nevertheless wears out rapidly owing to the great tendency of yeast of stick to any surface, and the wax requires frequent repair and replacement. As the coating wears out, the extrusion or discharge opening through which the yeast bar is extruded, becomes larger, whereby the cross sectional size of the opening becomes enlarged, and the resulting bar also becomes larger than that required for the given weight and consequently the blocks cut from the bar and of the required length are not of uniform weight, but become heavier as the wax coating wears out. Since yeast is sold by weight, any excess over the marked weight of the bar cannot be charged for and is lost to the manufacturer. To reduce such loss as much as possible it has been customary to shut down the machine at relatively frequent intervals and to replenish the wax coating to make it the proper thickness, with resulting loss of production.

The extruding operation produces a bar of substantially uniform cross sectional size and shape moving continuously but at an indeterminate speed, that is, at a speed which cannot be accurately predicted nor predetermined. Consequently, any cutting devices used cannot be timed to correspond to the speed of movement of the bar, nor driven positively at any definite speed, but the speed of operation thereof must vary in accordance with the changes in speed of the bar.

Furthermore, it is frequently necessary to extrude and to cut into blocks, bars differing in their cross sectional sizes and shapes. To provide a separate cutting machine for each such size or shape would be unduly expensive, would utilize too much floor space and would be impractical.

The present invention therefore contemplates the provision of means for adjusting the cross sectional size of the extrusion or nozzle opening through which the bar is fed, to compensate for the wear of the wax coating while the machine is in operation and without the necessity for a shut down.

The invention further contemplates the provision of dependable mechanism moving with and moved by a continuously moving bar, for cutting the bar into lengths automatically.

The invention further contemplates the provision of a blade chain so guided that the blades penetrate through the thickness of a moving plastic bar to sever the bar into blocks as the chain is moved by the bar.

The invention further contemplates the provision of means for quickly and easily adjusting the relative positions of the bar and blades to enable the blades to sever extruded bars of different heights which may be fad to the machine on various occasions.

The invention further contemplates the provision of a movable anti-friction guide and support for the blade chain, which support may be quickly and easily adjusted to take chains of various sizes, the chains being equipped respectively with blades arranged at different longitudinal intervals, thereby to enable the machine to cut blocks of different lengths by changing the chain therein, the support being also adjustable about a fixed pivot to arrange the path of movement of the cutting edges of the blades at the required angle to the path of movement of the extruded bar thereby to adjust the machine to extruded bars differing in height.

The various objects of the invention will be clear from the description which follows and from the drawings, in which:

Fig. 1 is a front elevational view, partly in section, of the adjustable cutting machine, showing in dash-dot lines, the extruded plastic bar as well as the driving chains and the sprocket wheels.

Figs. 2 is a fragmentary diagrammatical vertical sectional view of the supporting belts and of the bar-severing means.

Fig. 3 is a vertical sectional view of the machine taken on the line 3—3 of Fig. 1.

Fig. 4 is a top plan view of one of the blade-supporting links, showing in dash-dot lines portions of similar adjacent links.

Fig. 5 is a front elevational view of one of the links.

Fig. 6 is a front elevational view of the adjustable extruding nozzle determining the cross sectional shape and size of the extruded bar, which nozzle is adapted particularly for the extrusion of yeast, and showing an adjusted position of the nozzle in dash-dot lines.

Fig. 7 is a horizontal sectional view of the nozzle taken on the line 7—7 of Fig. 6.

Fig. 8 is an end elevational view of Fig. 6.

Fig. 9 is a fragmentary inclined sectional view of the nozzle taken on the line 9—9 of Fig. 7.

Fig. 10 is a vertical sectional view of the adjusting means for one end of the belt-supporting frame, taken on the line 10—10 of Fig. 1.

Fig. 11 is a front elevational view similar to Fig. 1, of a modified form of the machine, wherein the chain support is adjustable in length and angularly to operate on bars of different heights, the bar being shown by dash-dot lines.

Fig. 12 is a fragmentary vertical sectional view of the machine shown in Fig. 11 and showing particularly the driving means for the chain-guiding wheels and for the conveyor belt.

Figs. 13–15 are fragmentary diagrammatic front elevational views similar to Fig. 2, of various blade chains usable in the machine of Fig. 11, showing particularly the different spacing of the blades in the various chains and the different angular paths of movement of the cutting edges thereof.

In the practical embodiment of the invention shown by way of example, the mass of plastic or pasty material is forcibly advanced by any suitable means through the conduit 12 (Figs. 1 and 7) and into the reducing and shaping member 13 where the material is compacted and shaped into a bar. The moving bar is extruded through the extruding nozzle 14. When yeast is to be processed, the nozzle is made adjustable in width during operation of the machine to adjust the weight of the cut blocks. As the continuous bar 15 of extruded material emerges from the nozzle 14, it rests on and moves the belt 11 with it. During the movement of the bar, it engages and advances the cutting blades 16 which are so guided and supported that by reason of the movement imparted thereto by the bar, they successively penetrate and sever the bar into blocks 17 all preferably of the same length, the thus cut blocks being separated for further processing such as wrapping, by the conveyor belt 18 (Fig. 2).

With the above described general operation of the machine in mind, the detailed description may now proceed. Since the blocks 17 are illustrated as of substantially square cross-sectional shape, the outlet opening 19 of the shaping member 13 is made correspondingly square and communicates with the similarly shaped passage 20 of the nozzle 14. As has been indicated, when yeast is the material to be processed, the interior surfaces of the member 13 and of the extruding head or nozzle 14 are smoothly coated with a layer 21 of suitable wax about $\frac{1}{16}$ inch or more in thickness (Figs. 7 and 9). The layer must be smooth and unbroken, because any irregularity therein causes the yeast to stick or roughen, or causes pieces of yeast to break off the moving bar, and results in lack of control of the exact weight of the blocks 17. To compensate for the progressive reduction in thickness of the wax layer 21 as said layer is worn down by the abrading action of the yeast thereon, we have formed the nozzle 14 in two relatively movable sections and have provided thereby a quickly and easily operated manual adjustment to move one section of the nozzle diagonally along the fixed section, thereby to move one wall toward the opposite wall while extrusion of the bar continues without interruption. The adjustment is designed to maintain constant the cross-sectional area of the extrusion passage 20, and also to maintain constant the volume and weight of yeast in a block.

For this purpose, the movable section comprises the front wall 22 and the parts 23 and 24 of the bottom and top walls respectively of the nozzle 14. The walls are integrally joined and made movable as a unit relatively to the rear wall 25 and to the remaining relatively fixed parts 27 and 26 of the respective top and bottom walls (Figs. 6–9), the respective inner surfaces of which are coplanar with the said respective parts 24 and 23 of the top and bottom walls. Said parts 26 and 27 are thickened to provide flanges 26a and 27a overlapping the respective parts 23 and 24 to form a leak-proof joint therebetween, the adjacent edges 28 and 29 of said parts being in pressed contact and inclined inwardly and forwardly from the discharge end of the nozzle 14 to the shaping member 13. The flange 30 at the left hand end of said member 13 as viewed in Figs. 6 and 7 is preferably removably secured to the fixed flange 31 at the right hand end of the fixed section of the nozzle 14 and also to the separate front guiding flange 32 as by the screws 33 thereby to fix the flange 32 in place relatively to the nozzle so that the movable section of the nozzle may slide thereon. The upper guide surface 34 on the flange 32 is parallel to the edges 28 and 29 and on said surface slides with a leak-proof fit, the outer surface 35 at the right hand end of the front wall 22 of the movable nozzle section.

Extending forwardly from the front wall of the movable section is the flange 36, internally threaded as at 37 to receive the adjusting screw 38, which rotates in the hole 39 of the extension 40 of the flange section 32. The collar 41 pinned to the screw on one side of the extension, in connection with the wing nut 42 pinned to the screw on the other side of the extension, limits the movement of the screw to rotation only, whereby the movable section of the nozzle is moved toward the adjusted position thereof shown exaggerated and in dash-dot lines in Figs. 6 and 7, on rotation of the wing nut 42 in a counter-clockwise direction. The front wall 22 is thereby moved rearwardly to reduce the effective width of the passage 20 and to decrease the width of the extruded bar, thereby to reduce correspondingly the weight of the blocks cut from the bar 15. As the coating 21 begins to wear appreciably, which may be in a few hours run of the machine, instead of stopping the machine to re-coat the walls with wax, the nut 42 is merely turned enough so that a check of the weight of a cut block shows it to be correct, all of which can easily be done while the machine is running and without the production of an excessive number of overweight blocks. The coating is finally replenished at the end of the run or at some convenient time such as the end of the day.

To press the edges 28 and 29 of the nozzle sections tightly together against such separation as might permit leakage, plates as 44 (Figs. 7 and 9) are secured to the outer face of the front wall and the rear wall to extend across the joint at the inclined edges 28 and 29. Each plate carries a roller 45 tightly engaging the front edge 46 of its respective lug 47, there being two such lugs, one projecting forwardly from the front wall and the others projecting rearwardly from the rear wall. During the adjustment of the movable section of the nozzle, the roller engages and rolls along the lug 47, remaining in tight engagement therewith to maintain the sections with the edges 28 and 29 in leak-proof engagement with each other.

It will be understood that the adjustment above explained would be impractical or not commercially feasible if the wax coating 21 at the joint between the sections were injured. We have found that it is possible to retain a sufficiently smooth and continuous coating 21 at the joint to provide a commercially satisfactory product, while permitting the adjustment of the sections as above described. Such smooth coating can be provided only if the wax coating is broken smoothly and without irregularities at the line of the joint. This can be done by first coating all of the interior surfaces with a continuous coat, and then while the wax is still soft and plastic and before it has set, turning the nut 42 enough to slide the edge 28 of the wall parts 23 and 24 slightly on the corresponding edge 29 of the wall parts 26 and 27. The coating 21 is thereby broken along a thin line of demarcation between the edges 28 and 29 without chipping or the formation of any appreciable space therebetween. On the setting of the wax, the coatings on the top and bottom wall parts are separated, but operate as though they were in effect continuous.

To support the moving bar of material extruded out of the nozzle, a series of freely rotatable rollers are revolubly supported in the similar spaced front and rear frames 50 and 51. The upper reach 52 of the preferably free belt 11 rests on the rollers 54, the belt passing around the longitudinally spaced apart pulleys 55, 56 supported by the frames 50, 51 and arranged, one beyond one end of the row of rollers and the other beyond the other end of the row. Additional free rollers as 57 between the pulley 56 and the nozzle receive the bar as it emerges from the nozzle, said bar passing between the laterally adjustable upright rollers 58 which guide the bar on to the belt reach 52 and hold it against lateral displacement. The bar 15 and the belt 11 move together as a unit by reason of the friction therebetween, the belt in turn rotating the pulleys 55 and 56 and the rollers 54 all of which serve as a conveyor actuated by the bar and so supported as to move with a minimum of friction.

To cut the bar 15 into blocks of equal length as it rests on the belt 11, a series of blades 16 are linked together in a blade chain and so interposed in the path of the bar that the chain is operated by the moving bar and certain of the blades caused to penetrate the bar while they move longitudinally as a unit along with the bar. As best seen in Figs. 4 and 5, in the forward end 60 of each link 61 is fixed the shaft 62 carrying the rollers 63 adjacent the respective ends thereof. A collar 64 fixed to the shaft retains the roller in the space 59 in outwardly spaced relation to the link end 60. At its rear end 65, the link is offset outwardly to provide a recess 66 for the reception of the forward end part 60 of the succeeding link of the blade chain, the shaft 62 of the succeeding link passing through the rear end part 65 loosely, whereby the roller 63 is held in place between said part 65 and the collar 64, and the rear end of the link pivots on the shaft 62 of the succeeding link. The link is wider at its forward end than at its rear end to provide a support for the preferably rectangular cutting blade 16 which is of relatively thin sheet material. Screws as 68 passing through the strips 69 at the side edges of the blade, through the blade and into the links, secure the blade in place to two similar and substantially parallel aligned and laterally spaced links, which are also secured together by the shaft 62 to form a blade link unit of the chain.

In the form of the invention shown in Figs. 1 to 3, the lower reach 70 of the chain is inclined forwardly and downwardly to such an extent that three blades enter the bar at any one time to perform their cutting operations. In Figs. 11 and 13 to 15, four of the blades enter the bar at one time, as will be more fully described hereinafter. As seen in Fig. 2, the right hand blade 16a is about to enter the bar 15 and the left hand blade 16d has completed its cutting action and is about to begin its withdrawing movement out of the bar. Owing to the downward inclination of the reach 70 of the blade chain, as the extruded bar moves in the direction of the arrow out of the nozzle 14, the blades 16b and 16c, which have partly penetrated the bar or which are interposed in the path of the bar, are moved thereby, with and at the same speed as the bar to operate the entire blade chain. On such chain movement, the blades 16b and 16c gradually penetrate completely through the bar to sever it into the blocks 17, which are slightly separated by the blade 16d as said blade is withdrawn in an arcuate path from the bar.

It will be noted that while the blade chain is driven only by the moving extruded bar of material, anti-friction means are provided to support and guide the chain and to insure the movement of its lower reach 70 in the desired downwardly inclined direction under a minimum of power applied thereto by the bar. Such means comprises not only anti-friction bearings wherever possible for all shaft supports and for the rollers 63 and 54, but also includes the larger guide wheel 71, the smaller guide wheel 72, the fixed upper guide 73 along the upper reach of the chain and the fixed lower guide 74 along the lower reach 70. The outstanding rim flange 75 of the wheel 71 prevents the rollers of the links from leaving the rim 76 of the wheel as the chain moves in its endless path. A similar rim flange 77 is provided on the wheel 72 and may also be provided if desired, on the fixed guides 73 and 74 which are interposed between the wheels 71 and 72 and on which the link rollers 63 roll as best seen in Fig. 1. To reduce the friction of the rollers on the rims of the wheels 71 and 72 and on the respective roller shafts 62 to a minimum so that the plastic bar 15 does not become deformed under the excess force which might otherwise be required to operate the blade chain, said wheels are preferably rotated continuously, though it will be understood that fixed arcuate guides would also serve in place of the wheels to guide the chain but only in cases where the extruded bar is of relatively stiff but easily severable material such as clay having a reasonable ultimate compressive strength and hence not likely to become deformed under the pressure required to move the chain.

A sprocket wheel on the shaft 78 of th wheel 77, is driven by the sprocket chain 79 passing around the sprocket wheel 80 on the shaft 81 of the larger wheel 71. Said chain 79 also engages the sprocket wheel 82 on the shaft 83 which is carried by the bearings 84 resting on the frames 85. The lower ends of said frames are suitably secured to the bed plate 86 (Figs. 1 and 3). To drive the shaft 83, a second sprocket wheel on said shaft is operated by the chain 87 passing around the sprocket wheel 88 on the end shaft 89 of the reduction gearing 90 which is driven by any suitable means such as the motor 91. On the same shaft 89 is the sprocket wheel 92 which drives the wheel 93 on the conveyor belt shaft 94 (Fig. 1) on which is mounted the pulley 95 for the separating belt 18 for the blocks. Said belt is driven at a greater speed than that of the belt 11, so that when a block 17 is severed from the bar 15 and is advanced onto the belt 18, the block is jerked forward and away from the succeeding block by the belt to space the blocks apart (Fig. 2).

As has been indicated, means are provided for adjusting the machine to operate properly on bars of different height. Such means is based on the adjustment of the angle which the path of movement of the cutting edges of the blades makes with the path of movement of the bar during the cutting operation. The angle may conveniently be changed by changing either path, that is, by changing the path of the blade edges or the path of the bar. In Fig. 1 is shown means for adjusting the path of the bar while no change is made in the path of the blades. Such adjustment as shown in Fig. 2, may move the path of the bar out of the horizontal path shown in Fig. 1, while the blades remain vertical during the cutting operation. Cutting the inclined bar vertically produces inclined (not square) ends on the block 17, which ends may be objectionable in some cases. Hence in Fig. 11 is shown alternate means for adjusting the path of the blade edges instead of the bar during the cutting operation to make square ends on the blocks. To change the path of movement of the bar 15, means are provided for raising and lowering those ends of each of the frames 50 and 51 nearer the nozzle 14 and thereby correspondingly adjusting the adjacent end of the belt 11 vertically to vary the height of the right hand end of the bar 15 as viewed in Figs. 1 and 2.

For this purpose, the shaft 96 for one of the rollers 54 is made of sufficient diameter to serve as a pivot for the frames 50 and 51. The pivot shaft 96 is supported in suitable brackets as 97 secured to the bed plate 86. Upstanding from the plate 86 and rotatable therein are the upright adjusting screws 98 (Figs. 1, 3 and 10) each having a head on the under side of the bed plate and a nut 99 pinned thereto and arranged at the upper side of said plate. The shank of the screw passes through an internally threaded hole in the flange of the frame whereby rotation of the screw raises or lowers one end of the frame 50 or 51, as shown by the full and dash-dot lines of Fig. 10, to swing the belt reach 52 out of the normal horizontal position thereof shown by the dash-dot line of Fig. 2 and into the inclined position shown. Such position depends only on the change in height of the bar which is supplied to the cutting blades by the extruding nozzle. It will be understood that if the lengths of the blocks to be cut from the bar remain unchanged and only the height of the bar is changed, the beginning and end of the path of the cutting movement of the blade edges and the angle of said path to the horizontal all remain unchanged. That is, the lower or cutting edge of the blade 16a touches the upper face of the bar 15 at the line 15a (Fig. 2) where the cutting path of the blade begins. The blade edge completes its penetration of the bar at the point 15b on the upper face of the belt reach 52, the blade 16d having reached the position wherein its cutting edge is at the line or point 15b and wherein it is in alignment with the center line of the pivot 96.

The points 15a and 15b, determining the beginning and ending of the cutting operation, are not changed by the adjustment of the belt reach 52 to a different angle, since the belt is raised at the blade 16a only by the amount which the height of the new bar to be cut is less than that of the bar shown in Fig. 1 and which it replaces. Raising the belt carries the top surface of the smaller bar into contact with the cutting edge of the blade 16a at the point 15a. Similarly, if the height of the bar is increased, the upper surface of the belt reach 52 is lowered until the blade 16a just touches the upper surface of the higher bar at the point 15a. By arranging the pivot shaft 96 in vertical alignment with the blade 16d, the blades will complete the cut at the same point 15b regardless of the level or the inclination which the top surface of the bar 15 assumes in the adjustment thereof. However, should the lengths of the blocks 17 be changed, the point 15a of the beginning of the cutting path cannot be retained unchanged. Such change in length may readily be accomplished by merely substituting a blade chain having the desired blade interval for the chain in place around the wheels 71 and 72. To permit the change to be made quickly, one of the shafts 62 may be made quickly removable in a direction axially thereof from the links 61, as by substituting a cotter pin for one of the collars 64 in a manner well known in conveyor chains. The change in the chains may require adjustment of the distance between the wheel shafts 81 and 78 and suitable means for such adjustment is provided as shown for example in Fig. 11 and as will be more fully described hereinafter.

Obviously, when the right hand end of the belt 11 is raised on the adjustment of the frames 50 and 51, that part of the belt to the left of the pivot shaft 96 (as viewed in Fig. 1) is lowered. It becomes advisable in that case to lower the upper reach of the belt 18 correspondingly. The shaft 94 for the belt pulley 95 is therefore mounted in the bearing block 100 slidable in the groove 101 of the bracket 102 and adjustable therein by means of a suitable adjusting screw 103. Rotation of said screw in the proper direction raises or lowers the shaft 94 as required to arrange the upper reach of the belt 18 at the same level as the left end of the upper reach 52 of the belt 11.

In operation, the bar extruded continuously from the nozzle 14 by any suitable means, is guided by the upright rollers 58 on to the upper reach 52 of the belt 11. The bar sticks to the belt sufficiently to move it as a unit with the bar. As said bar advances, its forward end comes into contact with one of the blades 16 which is interposed in the path of the bar, whereupon the blade is moved with and by the advancing bar to move the chain through its endless path around the wheels 71 and 72. Rotation of said wheels in the direction of movement of the blade chain aids in overcoming possible friction between the link rollers 63 and the rims of the wheels and between the rollers and the respective shafts 62 whereby little force is required to move the chain and its blades. The blade at 16a first contacts the bar, then as the bar and chain advance, the blade begins to move downwardly through the bar to the position of the blade 16b, then to the position of the blade 16c and finally penetrates the bar to cut off the block 17 at the point 15b. The cut block is separated from the adjacent bar by the blade 16d as said blade rises at the beginning of its rotational movement around the wheel 71. The block 17 advances on to the belt 18 which moves the block faster than the bar and thereby further separates it enough from the succeeding block to permit the block to be wrapped or fed to any desired point for further processing.

In that form of the invention shown in Figs. 11 and 12, adjustment to bar height is attained by changing the cutting path of the blades and adjustment to block length attained by substituting the proper chain and further adjusting the guide wheel bearing if required. There is also shown a somewhat different drive for the guide wheels 105 and 106 which are similar to the corresponding wheels 71 and 72. The wheels 105 and 106 together with the upper guide 107 and the lower guide 108 for the link rollers 63 are all so supported that they may be swung as a unit free of any relative movement, about the fixed pivot 109 to change the inclination of the guide 108 and thereby to change the angle of the cutting path of the cutting edges of the blades. For this purpose, the bearing 110 for the wheel shaft 111 of the wheel 105, is mounted on the pivoted frame 112, while the bearing 113 for the shaft 114 of the wheel 106 is adjustably mounted on the inclined surface 115 of said frame. Said surface is parallel to the upper guiding surface of the guide 108, one end part of which is swingingly suspended from the fixed pivot 109 as by the bracket 116 (Fig. 12) in sufficient radial spaced relation to the rim of the wheel 105 to permit the link rollers 63 to be inserted between and guided by said rim and the guide 108 to which the bracket 116 is secured. The other end part of the guide is secured to the frame 112 as by the connector 117 of any suitable type. The frame 112 is also mounted to swing on the pivot 109 which is fixed to the brackets 118 upstanding from the bed plate 86.

To hold the frame 112 and the wheels, blade chain, guides and other parts carried thereby in adjusted position relatively to the belt 11, the extension 119 of the frame 112 is slotted as at 120 to receive the bolt 121 to which the wing nut 122 is threaded. Said bolt is screwed or otherwise secured to the bracket 123 upstanding from the bed plate 86. On loosening the wing nut 122, the extension 119 is freed of the pressure of the nut, whereby the frame 112 may be swung on its pivot 109 to arrange the guiding surface of the guide 108 at the proper angle to the horizontal to cause cutting of the bar of the selected height. After adjustment, tightening of the nut 122 holds all of the parts on the frame, and the frame itself, in the adjusted position. The election of the required angle for the guide is illustrated in Figs. 13–15 and will be later explained in greater detail.

It will be understood that in adjusting the chain guides and support for bar height only, and without change in block length, the blade chain need not be replaced because the blades 16 are initially of sufficient height to cut bars varying considerably in height. However, when the chain is replaced by another having a different blade spacing or interval, the chain may not fit properly over the guide wheels. In that case, the distance between the centers of the guide wheels is adjusted by loosening the bolt 124 (Fig. 11) which passes through the slot 125 of the bearing 113 and into the frame 112. The bearing is then moved along the inclined surface 115 by the adjusting screw 126 which rotates freely in the upstanding lug 127 of the frame 112 and is in threaded engagement with the lug 128 of the bearing. The collar 129 fixed to the screw adjacent the lug 127 prevents longitudinal movement of the adjusting screw. When the bearing 113 has been adjusted, the bolt 124 is tightened to hold the parts in the adjusted positions thereof. Since the inclined surface 115 is parallel to the upper guiding surface of the guide 108, adjustment of the bearing as above described does not alter the path of the cutting edges of the blade.

The drive for the wheels 105 and 106 and for the belt 18 is somewhat different from that shown in Figs. 1 and 3. In this form of the invention, the motor shaft 130 carries the sprocket wheel 131 driving the wheel 93 through the chain 132. On said shaft 130 is also mounted the gear wheel 133 which meshes with the gear wheel 134 loosely mounted on the pivot 109 and carrying the sprocket wheel 135. The sprocket chain 136 on the wheel 135 and around the sprocket wheel 137 on the wheel shaft 111 rotates said shaft and the belt pulley 138 thereon. To drive the guide wheel 106, the belt 139 passes around the pulley 138 and the pulley 140 on the wheel shaft 114. An idler pulley 141 engages the belt 139 and is adjustably mounted on the frame 112 to put the proper tension on the belt after adjustment of the guide wheels, as by means of the adjusting screw 142 and the adjustable bearing 143 for the shaft of the idler pulley.

The angle which the path of movement of the cutting edges of the blades makes with the path or direction of movement of the extruded bar can be determined from the height and length of the block to be cut and the number of blades engaged in the cutting operation at any one time. The extension 119 may therefore be calibrated as at 144 to indicate the guide angle required for a block of any desired dimensions. In Figs. 13–15 there are shown in relatively heavy dash-dot lines, the directions of movement of the rollers, which direction corresponds to the direction of the upper surface of the guide 108 and is parallel to the direction of movement of the cutting edges of the blades during the cutting operation, to produce the blocks B, C, and D of different heights and lengths. In the three cases illustrated, five blades are the maximum which may engage the bar at any one time. The severing cut ends with the blade 16e at the point 15b in all cases, as in Fig. 2, but the point 15a of beginning of the cut varies because the length of the block and the blade interval vary. For a higher (or thicker) bar, the extension 119 is raised to the proper angle. For a lower (or thinner) bar, the extension is lowered until the blade 16a just touches the bar when the blade 16e just touches the belt 11. If no bar is present, the lower edge of the blade 16a may be arranged at the bar height above the upper surface of the belt 11 to attain the required adjustment.

It will now be seen that we have provided a simple, efficient and dependable continuously operating and adjustable mechanism, working in unison with a extruded bar of material and operated thereby, that the adjusting devices for maintaining block weight as in the case of yeast, are operable while the machine is in operation, that the machine is adapted by a simple and quick adjustment for use with extruded bars of different heights, that by a change of blade chains it is adapted to cut bars into blocks of different lengths, and that the machine is adapted to meet exacting commercial requirements.

While we have herein described and shown certain specific embodiments of the invention, vari-

We claim:

1. In a machine of the character described, a nozzle having a discharge opening for the passage therethrough of a continuous bar of plastic material, said nozzle comprising a fixed section having a rear wall, a triangular top wall part and a similarly triangular bottom wall part extending from the rear wall, each of said parts terminating at the discharge opening and having a front edge beginning at said opening and inclined forwardly to the rear wall, and a movable section having top and bottom wall parts each provided with a similarly inclined rear edge abutting the front edge of the fixed section, the movable section having a front wall joining the top and bottom wall parts, means for pressing said inclined edges of the respective wall parts together, and manually operable means for sliding the movable section on the fixed section to vary the width of the discharge opening.

2. The machine of claim 1, the means for pressing the inclined edges together comprising a roller carried by the fixed section in forward spaced relation to the inclined edges thereof, and a lug on the movable section tightly engaging the roller when the inclined edge of the movable section abuts the inclined edge of the fixed section.

3. In a machine of the character described, a pair of rotating spaced guide wheels differing in diameter, and a blade chain passing around the wheels and movable relatively thereto and independently thereof and provided with freely rotatable rollers adapted to engage the rims of the wheels, the rollers rotating freely on rotation of the wheels independently of and at a speed unrelated to the movement of the chain, and means for driving the guide wheels including a motor, sprocket wheels for the guide wheels and a sprocket chain engaging the sprocket wheels.

4. In a machine of the character described, an adjustable nozzle having a discharge opening therein for the passage therethrough of a continuous bar of plastic material, said nozzle comprising a fixed section and a movable section each having a partial top and bottom wall, each of the walls terminating in an inclined free edge, the corresponding inclined edges of the respective sections being slidable on each other to a selected position.

5. A machine according to claim 4 and means securing the sections together in the selected position to adjustably fix the size of the discharge opening.

6. In a machine of the character described, wherein a continuous bar of plastic material such as yeast of low coherence and low compressive strength is advanced into the machine, an adjustable extruding nozzle having a discharge opening determining the cross-sectional size and shape of the bar, an articulated endless blade chain having a plurality of spaced apart blades and supporting rollers, a number of the blades being interposed in the path of the bar to be moved thereby, the lower reach of the chain being movable in a downwardly inclined path whereby said interposed blades penetrate and sever the bar into blocks of predetermined length on the advance of the bar, rotatable guide wheels at spaced apart portions of the chain engaging and rotating a number of the rollers independently of and at a speed unrelated to the speed of movement of the chain to minimize the resistance of the rollers to rotation on the movement of the chain by said bar, and fixed guides for the rollers arranged between and substantially tangent to the rims of the wheels.

7. In a machine for shaping a continuously advancing bar and for severing the bar into blocks of predetermined length, a nozzle having a discharge opening for the passage of the bar, a blade chain having a number of blades in the path of the bar and movable by the bar, and means for guiding the blades to penetrate the bar including freely rotatable rollers on the chain and a pair of spaced apart revoluble guide wheels engaging and rotating a number of the rollers to minimize the friction resisting movement of the rollers and thereby to enable the bar to move the chain, the chain being normally immovable by the bar while the wheels remain stationary, and means independent of the presence or absence of the bar for rotating the guide wheels.

8. In a machine for severing a moving bar into blocks of predetermined length, spaced blades in the path of the bar and movable with and by the bar, means guiding the blades through the bar on the movement of the bar comprising a pair of spaced apart revoluble wheels, means for rotating the wheels independently of the bar, a pair of fixed guides between and tangent to the wheels and rollers supporting the blades and engaging and supported by the wheels and the guides, means for adjusting the vertical position of the bar relatively to the blades while maintaining constant the position of the bar at the point of complete severance thereof by the blades, said adjusting means comprising a frame carrying the blades and the guiding means, a pivot for the frame above said point of complete severance, a projection on the frame in horizontally spaced relation to the pivot and having a slot therein arcuate about the pivot, and means passing through the slot to fix the frame in adjusted position.

9. In a machine for severing a moving bar into blocks of the same length, spaced blades in the path of the bar and movable with and by the bar, means guiding the blades through the bar on movement of the bar, and means for adjusting the vertical position of the bar relatively to the blades while maintaining constant the position of the bar at the point of complete severance thereof by the blades, said adjusting means comprising a frame carrying the blades and the guiding means, a pivot for the frame above said point of complete severance, a projection on the frame in horizontally spaced relation to the pivot and having a slot therein arcuate about the pivot, and means passing through the slot to fix the frame in adjusted position.

10. In a machine of the character described, a blade chain having blades interposed in the path of a moving bar of relatively soft plastic material and moved thereby, means for guiding the chain to move the blades into the bar and thereby to sever the bar into blocks on the movement of the bar, said means comprising a pair of guide wheels of different diameters and spaced apart, the chain passing around said wheels, supporting rollers on the chain sliding and rolling freely on the rims of the wheels, and means independent of the chain for rotating the wheels and the rollers at a speed unrelated to the speed of movement of the chain and comprising a motor and operative connections between the motor and the wheels.

11. In a machine of the character described, means for supporting a bar of plastic material movable in a given direction, a blade chain having thereon spaced blades each terminating in a cutting edge, chain guiding means comprising a pair of spaced revoluble wheels guiding spaced apart portions of the chain, and fixed guides for the remainder of the chain guiding the blades to move in a direction different from the given direction, and means for adjusting the angle between the supporting means and the fixed guides and thereby to adjust the machine to cut blocks of substantially different heights and different lengths from the bar, the adjusting means comprising a frame having a pivot near one end thereof, the frame supporting the chain and the wheels and the fixed guides and having a slot near the other end thereof arcuate about the pivot, and securing means for the frame passing through the slot, and means on the frame to adjust the distance between the wheels.

12. In a machine of the character described, bar-supporting means movable substantially horizontally by an extruded bar, spaced blades having corresponding cutting edges movable by the bar in an inclined path to penetrate the bar, means for guiding said blades comprising a pair of spaced apart revoluble wheels, means for rotating the wheels at a speed independent of the speed of movement of the blades, rollers supporting the blades and freely rotatable on the rims of the wheels, and means for adjusting the angle of inclination of said path to adjust the blades to cut bars differing in height.

13. In a machine for shaping a continuously advancing bar and severing the moving bar into blocks, a series of spaced apart cutting blades in the path of the bar, links pivoted to each other in pairs, each pair of links carrying a blade at one end thereof to form a blade chain, a pivot shaft fixed to the blade-carrying ends of each pair of links and passing loosely through the other ends of the succeeding pair of links, a roller loosely mounted on each end of the shaft beyond the links, said chain being replaceable by a different chain having blades in different spaced relation to those of the first-mentioned chain thereby to render the machine capable of cutting block from the bar differing in length, the guiding means comprising a pair of spaced revoluble guide wheels for the rollers, each of the wheels engaging a number of said rollers, an upper guide for the rollers between the wheels, a lower guide for the rollers between the wheels, the rollers rolling and sliding freely on the rims of the wheels and on the upper and lower guides, means for adjusting one of the wheels relatively to the other, a pivoted frame carrying the wheels, guides and wheel adjusting means and being adjustable as a unit with the wheels and guides about the pivot of the frame, means for retaining the frame in adjusted swung position, and means for rotating the wheels at speeds independent of the speed of movement of the chain and therethrough rotating the rollers to reduce the resistance of the rollers to movement as the chain is moved by the action of the bar on the blades.

14. In a machine for cutting a moving extruded bar of yeast, butter, soap or the like material having little coherence and little compressive strength into blocks, an articulated blade chain having blades arranged in the path of an extruded bar, only the movement of the bar imparting substantial movement to the chain by the direct engagement of the bar with the chain, and anti-friction means for supporting the chain comprising freely rotatable rollers on the chain, a pair of wheels each having a rim bounded by a flange at the outer edge thereof, the rollers rolling successively on the rim on the rotation of the wheels without materially affecting the movement of the chain, and means independent of the movement of the chain and of the bar for positively rotating the wheels at a speed unrelated to the speed of movement of the chain to reduce the resistance of the chain and the rollers to movement.

15. In a machine of the character described, a pair of guide wheels, means for continuously and positively rotating the wheels, a pair of spaced apart fixed straight guides, one arranged between the corresponding upper parts of the respective wheels and tangent thereto and the other arranged between the corresponding lower parts of the respective wheels and tangent thereto, and a blade-carrying chain movable independently of the movement of the wheels and comprising a series of successive pairs of substantially parallel links, the links of each pair being transversely spaced apart, a shaft passing through the forward ends of each pair of links and being secured thereto, a blade carried by said ends of the links, said shaft passing loosely through the other ends of the adjacent pair of links, and a pair of rollers loosely mounted at the end parts of the shaft and rotatable by the wheels independently of the movement of the chain.

16. In a machine for shaping a continuously advancing bar and for severing the bar into blocks of predetermined length, a nozzle having a discharge opening of predetermined size and shape for the passage of the bar, a blade chain having a number of blades in the path of the bar and movable by the bar in the direction of movement of the bar, and means for adjusting the effective width of the discharge opening of the nozzle comprising a movable nozzle section forming the front wall and parts of the top and bottom walls of the nozzle and slidable on the remaining relatively fixed parts of the top and bottom walls of the nozzle, the edges of the top and bottom walls of the movable section being inclined and sliding on the correspondingly inclined respective edges of the fixed parts, means for pressing the corresponding inclined edges together, and an adjusting screw in threaded engagement with the movable section and operable while a bar is being advanced through the discharge opening.

ALBERT SHARP.
GEORGE SHARP.

REFERENCES CITED

The following references are of record in the file of this patent:

UNITED STATES PATENTS

| Number | Name | Date |
|---|---|---|
| 297,671 | Chambers, Jr. | Apr. 29, 1884 |
| 635,177 | McCabe | Oct. 17, 1899 |
| 897,462 | Hanak | Sept. 1, 1908 |
| 1,024,122 | Dawkins et al. | Apr. 23, 1912 |
| 1,160,792 | Van Houten | Nov. 16, 1915 |
| 1,452,080 | Jones | Apr. 17, 1923 |
| 1,585,149 | Humphrey | May 18, 1926 |